COUPLING MEANS FOR CONNECTING HORSE-DRAWN VEHICLES TO TRACTORS

Filed Oct. 15, 1941

Inventor
Herbert William Batkin,
by Lester L. Sargent
Attorney

Patented June 27, 1944

2,352,511

UNITED STATES PATENT OFFICE 2,352,511

COUPLING MEANS FOR CONNECTING HORSE-DRAWN VEHICLES TO TRACTORS

Herbert William Batkin, near Whitchurch, England, assignor to Salopian Engineers, Limited, Whitchurch, England Application October 15, 1941, Serial No. 415,120
In Great Britain November 8, 1940

4 Claims. (Cl. 280—33.44)

The invention relates to coupling means for connecting, to tractors, the shafts of vehicles which are normally horse-drawn, and has for its object to provide an improved construction thereof.

An appliance constructed according to this invention is so arranged that, when in use, it is supported at its forward end by the shackle or connecting means by which it is pivotally and detachably connected to the tractor, while it is supported as to the rest of its length by the shafts of the vehicle, to which it also gives support.

In carrying out the invention, two transverse members are provided each having parts so arranged that they pass both over and under the shafts. For instance, the transverse members may consist of tubes passing under the shafts and each having, adjustably clamped at each of its ends, an inverted L-piece the horizontal arm of which is adapted to pass over the respective shaft.

The transverse members may be secured, at about their mid points, to a single longitudinal member which, at its forward end, has a downwardly extending part carrying the shackle, or other connecting means for connecting the appliance to the tractor. This shackle may be adjustably clamped to the said downwardly extending part.

One of the transverse members, preferably the forward member, may be permanently secured to the longitudinal member, but the other transverse member is preferably adjustably clamped to the longitudinal member to adapt the appliance to different lengths of shafts.

The longitudinal member may be strengthened by suitable struts or stays; as may also the transverse member which is fixed to the longitudinal member.

To keep the appliance in endwise relationship with the shafts, chains connected to the longitudinal member may be connected also to the usual drag links on the shafts.

A convenient embodiment of the invention is described with reference to the accompanying drawing in which.

Figure 1:
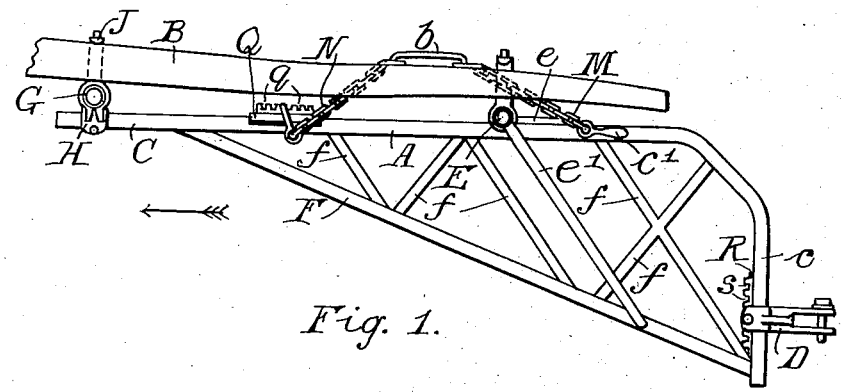
Figure 1 is a side elevation of an appliance constructed according to the invention, and showing also the shafts of a vehicle attached to the appliance.
Figure 2:
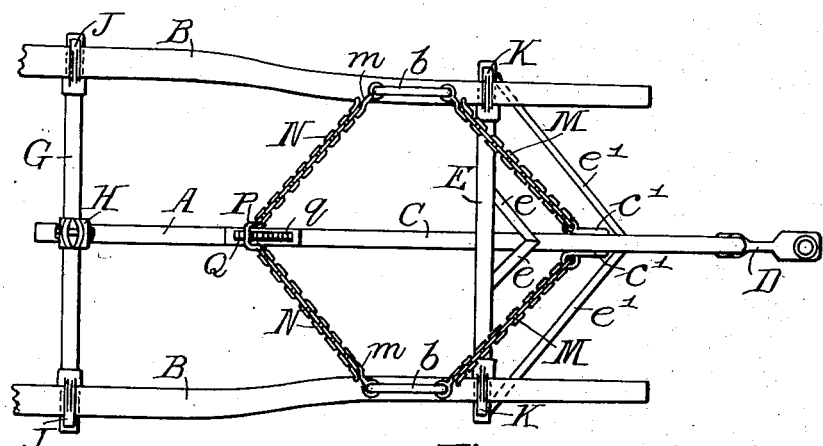
Figure 2 is a plan view of the appliance shown in Figure 1.
Figures 3, 4:
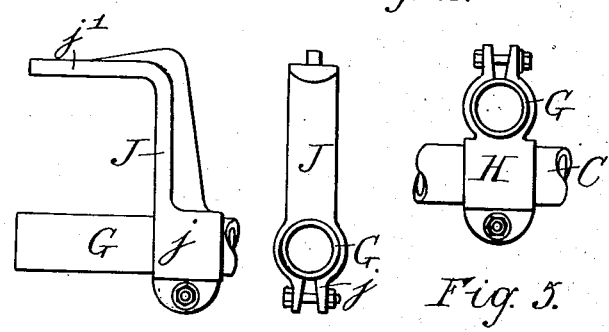
Figure 3 is a view in side elevation, and to a larger scale, of one of the inverted L-shaped brackets clamped on one end of one of the transverse members.
Figure 4 is a view of the bracket shown in Figure 1 and as seen looking in the direction of the arrow of that figure; and, Figure 5 is a view in side elevation, and to the same scale as Figure 3, of the cross clamp by which the rear transverse member is adjustably clamped to the longitudinal member of the appliance.

In this drawing, A indicates the coupling appliance as a whole and B, B, the two shafts of a vehicle to which the appliance is coupled. The appliance comprises a longitudinal tubular member C which is curved or bent at its forward end to form a downwardly extending member $c$ to which is adjustably clamped a shackle D for connection to the draw bar or other draught member of a tractor, this latter not being shown. Extending over the horizontal portion of the member C and welded thereto is a tubular forward transverse member E. F is a slanting tubular member welded at its rearward end to the member C at a point near the rearward end thereof, and welded at its forward end to the downward part $c$ of the member C. Between the sloping member F and the longitudinal member C there are numerous strengthening stays indicated by the letter $f$. The transverse member E is braced to the longitudinal member by short stays $e$ and to the sloping member F by longer stays $e^1$, all these being welded at their respective ends.

G is the rear transverse member, passing over the member C and being adjustably secured thereto by a cross clamp H, the latter being shown to a larger scale in Figure 5. This clamp allows for ready adjustment of the member G along the member C to suit different lengths of shafts.

Clamped near each end of the transverse member G is an inverted L-shaped bracket J having at its lower end an integral clamp $j$ to engage adjustably on the member G. The bracket J has also a laterally extending arm $j^1$ which with the respective end of the member G forms a fork to embrace the respective shaft near its rear end. The adjustability of the L-shaped brackets J along the member G is to adapt them to different widths of shafts.

K, K, are L-shaped brackets clamped to the transverse member E near the ends thereof. These brackets are similar to the brackets J and are adjustable in a similar manner along the member E also to suit different widths of shafts.

In order to restrain longitudinal movement of the coupling means in relation to the shafts, two pairs of chains M, M and N, N are provided. The chains M, M are permanently connected to the longitudinal member C by closed hooks $c^1$ and they are detachably connected at their rear ends to the usual drag hooks $m, m$ permanently engaged with the usual drag links $b, b$ on the shafts. The chains N, N connect at their rear ends to a D-link or U-piece P adapted to engage in one of a number of notches $q$ of a rack Q welded to the member C towards the rear end thereof. By this means the chains can be adjusted to take up undue slackness.

R is a bracket having notches $s$ one of which receives the pin of the clamp D and thus ensures that the clamp will not move up or down the part $c$ while the appliance is in use.

It will be seen that the transverse members E and G and the brackets J are restrained from movement along the shafts only by the chains M, M, N, N, the chains M, M taking the tractive effort and the chains N, N the effect produced when the tractor is holding the vehicle back or when in reverse.

An appliance as above described is especially advantageous where the vehicle has only 2 wheels as it is well adapted to resist the tendency of the shafts to move upwards or downwards. In such case the adjustability of the bracket D up and down in relation to the part $c$ allows of the load being brought into balance over the wheels.

Having fully described my invention what I claim and desire to secure by Letters Patent is:

1. In an appliance for connecting to tractors, the shafts of a vehicle which is normally horse-drawn, the combination of connecting means for pivotally and detachably connecting the spaced shafts of the said vehicle to a tractor, means supporting the front end of the appliance, tubular transverse members adapted to pass under the shafts, inverted L-shaped brackets clamped to the ends of said tubular members and having portions adapted to pass over the shafts and giving slidable support thereto, and flexible connectors each attached at one end to the appliance and at its other end adapted for connection to the shafts.

2. In an appliance for connecting to tractors, the shafts of a vehicle which is normally horse-drawn, the combination of means for pivotally and detachably connecting the spaced shafts of the said vehicle to a tractor, means affording a support for the front end of the appliance, transverse members of the appliance, parts of said members at the ends thereof adapted to pass over and under the shafts to afford a slidable connection therewith, a longitudinal member attached to said transverse members, a downward portion at the front end of said longitudinal member carrying said connecting means, and flexible connectors each attached at one end to the appliance and at its other end connectible to the shafts.

3. In an appliance for connecting, to tractors, the shafts of a vehicle which is normally horse-drawn, the combination of means for pivotally and detachably connecting the shafts to a tractor, said connecting means supporting the front end of the appliance, transverse members of the appliance, parts of such transverse members at the ends thereof engageable over and under the shafts to afford a slidable connection therewith, a longitudinal member attached to said transverse members, one of said transverse members being clamped to said longitudinal member in a manner to allow of adjustment therealong, and flexible connectors each attached at one end to the appliance and at its other end connectible to the shafts.

4. In coupling means for connecting normally, horse drawn vehicles to tractors, the combination of means for pivotally and detachably connecting the shafts to a tractor, said connecting means supporting the front end of the appliance, means for adjusting said connecting means as to height in relation to the front of the appliance, transverse members of the appliance, parts of such transverse members at the ends thereof engageable over and under the shafts to afford a slidable connection therewith, a longitudinal member attached to said transverse members, one of said transverse members being clamped to said longitudinal member in a manner to allow of adjustment therealong, and flexible connectors each attached at one end to the appliance and at its other end connectible to the shafts.

HERBERT WILLIAM BATKIN.